(12) United States Patent
Hwang et al.

(10) Patent No.: US 10,506,455 B2
(45) Date of Patent: Dec. 10, 2019

(54) OBTAINING ADDITIONAL SUPPORTED BANDS OF NEIGHBOR CELLS VIA AUTOMATIC NEIGHBOR RELATION (ANR)

(71) Applicant: NOKIA SOLUTIONS AND NETWORKS OY, Espoo (FI)

(72) Inventors: Woonhee Hwang, Espoo (FI); Eric Drury, Lake Zurich, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/156,846

(22) Filed: Jan. 16, 2014

(65) Prior Publication Data

US 2015/0201337 A1    Jul. 16, 2015

(51) Int. Cl.
| H04B 17/00 | (2015.01) |
| H04W 24/02 | (2009.01) |
| H04W 24/10 | (2009.01) |
| H04W 36/00 | (2009.01) |

(52) U.S. Cl.
CPC ........... *H04W 24/02* (2013.01); *H04W 24/10* (2013.01); *H04W 36/0083* (2013.01)

(58) Field of Classification Search
CPC . H04W 24/02; H04W 24/10; H04W 36/0083; H04W 36/0061; H04W 36/0094
USPC ...................................................... 455/67.11
See application file for complete search history.

(56) References Cited

U.S. PATENT DOCUMENTS

| 5,722,072 A | 2/1998 | Crichton et al. |
| 8,509,779 B2 | 8/2013 | Ali et al. |
| 8,619,608 B2 | 12/2013 | Sebire et al. |
| 2011/0028153 A1 | 2/2011 | Stadelmann et al. |
| 2011/0281615 A1* | 11/2011 | Yamada ............ H04W 36/0094 455/524 |
| 2012/0244905 A1* | 9/2012 | Zhao ...................... H04L 5/001 455/517 |
| 2013/0040640 A1 | 2/2013 | Chen et al. |
| 2013/0053103 A1 | 2/2013 | Kim et al. |
| 2014/0295873 A1* | 10/2014 | Lunden ............... H04W 52/146 455/454 |
| 2015/0017999 A1* | 1/2015 | Chen ..................... H04W 16/14 455/452.1 |
| 2015/0172907 A1* | 6/2015 | Jung ..................... H04W 24/10 370/329 |

FOREIGN PATENT DOCUMENTS

| CN | 102014424 A | 4/2011 |
| CN | 102293032 A | 12/2011 |

(Continued)

OTHER PUBLICATIONS

Australian Examination Report application No. 2015206067 dated Apr. 4, 2018.

(Continued)

*Primary Examiner* — Xin Jia

(74) *Attorney, Agent, or Firm* — Squire Patton Boggs (US) LLP

(57) ABSTRACT

Systems, methods, apparatuses, and computer program products for obtaining additional supported bands of neighbor cell(s) are provided. One method includes reading, by a user equipment, a frequency band list broadcast by at least one neighbor cell, and reporting the frequency band list to a cell serving the user equipment.

10 Claims, 6 Drawing Sheets

(56) References Cited

FOREIGN PATENT DOCUMENTS

| JP | 2013-502749 | A | 1/2013 |
|---|---|---|---|
| WO | 2010073830 | A1 | 7/2010 |
| WO | 2012101482 | A1 | 8/2012 |
| WO | 2012/174440 | A1 | 12/2012 |
| WO | 2013/0246454 | A1 | 2/2013 |

OTHER PUBLICATIONS

Korean Office Action dated Apr. 24, 2017, issued in corresponding KR Application No. 10-2016-7022232.

New Postcom, "Discussion on neighbour cell multiband capability update process", 3GPP TSG RAN WG3 Meeting #77bis, R3-122164, Sep. 29, 2012.

Japanese Office Action issued in corresponding Japanese Patent Application No. 2016-564396 dated Sep. 11, 2017.

Qualcomm Europe, T-Mobile, 3GPP TSG RAN2#60, R2-074907, Jeju, South Korea, Nov. 5-9 2007, 6 pages, "Inter-RAT/frequency Automatic Neighbour Relation Function."

Japanese Office Action issued in corresponding Japanese Patent Application No. 2016-564396 dated Jun. 7, 2018.

Nov. 21, 2018 Examination Report No. 2 for Standard Patent Application issued in Australian Patent Application No. 2015206067.

Japanese Office Action corresponding to Appln. No. 2016-564396, dated Feb. 28, 2019.

3GPP TS 36.423 V12.0.0 (Dec. 2013) "3rd Generation Partnership Project; Technical Specification Group Radio Access Network; Evolved Universal Terrestrial Radio Access Network (e-UTRAN); X2 application protocol (X2AP) (Release 12)"; 3rd Generation Partnership Project (3GPP); Mobile Competence Centre; 650, Route des Lucioles; F-06921 Sophia-Antipolis Cedex; France; Dec. 17, 2013, pp. 1-144, XP050728900, [retrieved on Dec. 17, 2017]; pp. 21-22, 8.3.3.2 X2 Setup—Sucessful Operation; p. 21, Figure 8.3. 3.2-1; p. 79, "92.60 MultibandInfoList".

3GPP TS 36.423 V8.9.0 (Mar. 2010) "3rd Generation Partnership Project; Technical Specification Group Radio Access Network; Evolved Universal Terrestrial Radio Access Network (e-UTRAN); X2 application protocol (X2AP) (Release 8)"; 3rd Generation Partnership Project (3GPP); Mobil Competence Centre; 650, Route des Lucioles; F-06921 Sophia-Antipolis Cedex; France; pp. 1-100.

International Search Report application No. PCT/EP2015/050642 dated Mar. 31, 2015.

Chinese Office Action corresponding to CN Appln. No. 201580004647. 4, dated Jul. 22, 2019.

Indonesian Substantive Examination Report Stage I corresponding to Appln. No. P00201605293, dated Sep. 16, 2019.

\* cited by examiner

```
SystemInformationBlockType1 ::=         SEQUENCE {
    cellAccessRelatedInfo                   SEQUENCE {
        plmn-IdentityList                       PLMN-IdentityList,
        trackingAreaCode                        TrackingAreaCode,
        cellIdentity                            CellIdentity,
        cellBarred                              ENUMERATED {barred, notBarred},
        intraFreqReselection                    ENUMERATED {allowed, notAllowed},
        csg-Indication                          BOOLEAN,
        csg-Identity                            CSG-Identity              OPTIONAL    -- Need OR
    },
    cellSelectionInfo                       SEQUENCE {
        q-RxLevMin                              Q-RxLevMin,
        q-RxLevMinOffset                        INTEGER (1..8)            OPTIONAL    -- Need OP
    },
100 p-Max                                   P-Max                         OPTIONAL,   -- Need OP
    freqBandIndicator                       FreqBandIndicator,
    schedulingInfoList                      SchedulingInfoList,
    tdd-Config                              TDD-Config                    OPTIONAL,   -- Cond TDD
    si-WindowLength                         ENUMERATED {
                                                ms1, ms2, ms5, ms10, ms15, ms20,
                                                ms40},
    systemInfoValueTag                      INTEGER (0..31),
    nonCriticalExtension                    SystemInformationBlockType1-v890-IEs    OPTIONAL    -- Need OP
}

SystemInformationBlockType1-v890-IEs::= SEQUENCE {
    lateNonCriticalExtension                OCTET STRING (CONTAINING SystemInformationBlockType1-v8h0-IEs)
        OPTIONAL,    -- Need OP
    nonCriticalExtension                    SystemInformationBlockType1-v920-IEs    OPTIONAL    -- Need OP
}

-- Late non critical extensions
SystemInformationBlockType1-v8h0-IEs ::=    SEQUENCE {
105 multiBandInfoList                       MultiBandInfoList             OPTIONAL,   -- Need OR
    nonCriticalExtension                    SystemInformationBlockType1-v9e0-IEs    OPTIONAL    -- Need OP
}

SystemInformationBlockType1-v9e0-IEs ::= SEQUENCE {
101 freqBandIndicator-v9e0                  FreqBandIndicator-v9e0        OPTIONAL,   -- Cond FBI-max
106 multiBandInfoList-v9e0                  MultiBandInfoList-v9e0        OPTIONAL,   -- Cond mFBI-max
    nonCriticalExtension                    SEQUENCE {}                   OPTIONAL    -- Need OP
}

MultiBandInfoList      ::=  SEQUENCE (SIZE (1..maxMultiBands)) OF FreqBandIndicator
MultiBandInfoList-v9e0 ::=  SEQUENCE (SIZE (1..maxMultiBands)) OF MultiBandInfo-v9e0

MultiBandInfoList-r11  ::=  SEQUENCE (SIZE (1..maxMultiBands)) OF FreqBandIndicator-r11

MultiBandInfo-v9e0 ::=      SEQUENCE {
    freqBandIndicator-v9e0                  FreqBandIndicator-v9e0        OPTIONAL    -- Need OP
}

FreqBandIndicator     ::=               INTEGER (1..maxFBI)
FreqBandIndicator-v9e0 ::=              INTEGER (maxFBI-Plus1..maxFBI2)

FreqBandIndicator-r11 ::=               INTEGER (1..maxFBI2)

maxFBI              INTEGER ::= 64   -- Maximum value of fequency band indicator
maxFBI-Plus1        INTEGER ::= 65   -- Lowest value extended FBI range
maxFBI2             INTEGER ::= 256  -- Highest value extended FBI range
```

Fig. 1

| IE/Group Name | Presence | Range | IE type and reference | Semantics description | Criticality | Assigned Criticality |
|---|---|---|---|---|---|---|
| BandInfo | | 1 .. <maxnoofBands> | | | -- | -- |
| >FrequencyBandIndicator | M | | INTEGER (1.. 256, ...) | E-UTRA operating band as defined in TS 36.101 [42, table 5.5-1] | -- | -- |

| Range bound | Explanation |
|---|---|
| | Maximum number of frequency bands that a cell belongs to. The value is 16. |

Fig. 2

```
MeasResultEUTRA ::= SEQUENCE {
    physCellId                          PhysCellId,
    cgi-Info                            SEQUENCE {
        cellGlobalId                        CellGlobalIdEUTRA,
        trackingAreaCode                    TrackingAreaCode,
        plmn-IdentityList                   PLMN-IdentityList2          OPTIONAL
    }                                                           OPTIONAL,
    measResult                          SEQUENCE {
        rsrpResult                          RSRP-Range                  OPTIONAL,
        rsrqResult                          RSRQ-Range                  OPTIONAL,
        ...,
        [[ additionalSI-Info-r9             AdditionalSI-Info-r9        OPTIONAL
        ]],
300─    [[ multiBandInfoList-rxx                MultiBandInfoList-r11   OPTIONAL
        ]]
    }
}
         300
```
Fig. 3a

```
MeasResultUTRA ::=  SEQUENCE {
    physCellId                          CHOICE {
        fdd                                 PhysCellIdUTRA-FDD,
        tdd                                 PhysCellIdUTRA-TDD
    },
    cgi-Info                            SEQUENCE {
        cellGlobalId                        CellGlobalIdUTRA,
        locationAreaCode                    BIT STRING (SIZE (16))      OPTIONAL,
        routingAreaCode                     BIT STRING (SIZE (8))       OPTIONAL,
        plmn-IdentityList                   PLMN-IdentityList2          OPTIONAL
    }                                                           OPTIONAL,
    measResult                          SEQUENCE {
        utra-RSCP                           INTEGER (-5..91)            OPTIONAL,
        utra-EcN0                           INTEGER (0..49)             OPTIONAL,
        ...,
        [[ additionalSI-Info-r9             AdditionalSI-Info-r9        OPTIONAL
        ]],
        [[ multiBandInfoListUMTS-rxx            MultiBandInfoListUMTS-r11 OPTIONAL
        ]]
    }
}
         301
```
Fig. 3b

```
       MeasurementReport-v8a0-IEs ::= SEQUENCE {
400─       lateNonCriticalExtension         OCTET STRING                OPTIONAL,
           nonCriticalExtension             SEQUENCE {}                 OPTIONAL
       }
```
Fig. 4

OBTAINING ADDITIONAL SUPPORTED BANDS OF NEIGHBOR CELLS VIA AUTOMATIC NEIGHBOR RELATION (ANR)

BACKGROUND

Field

Embodiments of the invention generally relate to wireless communications networks, such as the Universal Mobile Telecommunications System (UMTS) Terrestrial Radio Access Network (UTRAN) Long Term Evolution (LTE) and Evolved UTRAN (E-UTRAN). For example, some embodiments relate to self-organizing networks (SON) and Automatic Neighbor Relationship (ANR).

Description of the Related Art

Universal Mobile Telecommunications System (UMTS) Terrestrial Radio Access Network (UTRAN) refers to a communications network including base stations, or Node-Bs, and radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS).

Long Term Evolution (LTE) refers to improvements of the UMTS through improved efficiency and services, lower costs, and use of new spectrum opportunities. In particular, LTE is a 3rd Generation Partnership Project (3GPP) standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE improves spectral efficiency in communication networks, allowing carriers to provide more data and voice services over a given bandwidth. Therefore, LTE is designed to fulfill future needs for high-speed data and media transport in addition to high-capacity voice support. Advantages of LTE include high throughput, low latency, FDD and TDD support in the same platform, an improved end-user experience, and a simple architecture resulting in low operating costs. In addition, LTE is an all internet protocol (IP) based network, supporting both IPv4 and IPv6.

A self-organizing network (SON) is a technology intended to make the configuration, management, and optimization mobile radio access networks simpler and faster. SON functionality was initially specified in 3GPP Release 8 and subsequent specifications. The initial technology making use of SON features is LTE, but SON has also been retro-fitted to older radio access technologies such as UMTS. The LTE specification supports SON features such as Automatic Neighbor Relation (ANR) detection.

SUMMARY

One embodiment is directed to a method comprising reading, by a user equipment, a frequency band list broadcast by at least one neighbor cell. The method may further comprise reporting the frequency band list to a cell serving the user equipment.

Another embodiment is directed to an apparatus comprising at least one processor and at least one memory including computer program code. The at least one memory and the computer program code are configured, with the at least one processor, to cause the apparatus at least to read a frequency band list broadcast by at least one neighbor cell, and to report the frequency band list to a cell serving the user equipment.

Another embodiment is directed to a computer program, embodied on a computer readable medium. The computer program is configured to control a processor to perform a process comprising reading a frequency band list broadcast by at least one neighbor cell, and reporting the frequency band list to a cell serving the user equipment.

Another embodiment is directed to a method comprising receiving, by a serving cell, a measurement report from a user equipment capable of reading and reporting a frequency band list broadcast by at least one neighbor cell. The frequency band list comprises frequency band numbers that the at least one neighbor cell supports, and the measurement report comprises an information element comprising the frequency band numbers supported by the at least one neighbor cell.

Another embodiment is directed to an apparatus comprising at least one processor and at least one memory including computer program code. The at least one memory and the computer program code are configured, with the at least one processor, to cause the apparatus at least to receive a measurement report from a user equipment capable of reading and reporting a frequency band list broadcast by at least one neighbor cell. The frequency band list comprises frequency band numbers that the at least one neighbor cell supports, and the measurement report comprises an information element comprising the frequency band numbers supported by the at least one neighbor cell.

Another embodiment is directed to a computer program, embodied on a computer readable medium. The computer program is configured to control a processor to perform a process comprising receiving a measurement report from a user equipment capable of reading and reporting a frequency band list broadcast by at least one neighbor cell. The frequency band list comprises frequency band numbers that the at least one neighbor cell supports, and the measurement report comprises an information element comprising the frequency band numbers supported by the at least one neighbor cell.

BRIEF DESCRIPTION OF THE DRAWINGS

For proper understanding of the invention, reference should be made to the accompanying drawings, wherein:

FIG. 1 illustrates an example of system information block 1 (SIB1), according to an embodiment;

FIG. 2 illustrates an example of a MultibandInfoList information element (IE) including frequency band indicators, according to an embodiment;

FIG. 3a illustrates an example of a MeasResultEUTRA report, according to one embodiment;

FIG. 3b illustrates an example of a MeasResultUTRA, according to one embodiment;

FIG. 4 illustrates an example of a measurement report including a lateNonCriticalExtension parameter, according to an embodiment;

DETAILED DESCRIPTION

Figure 5:
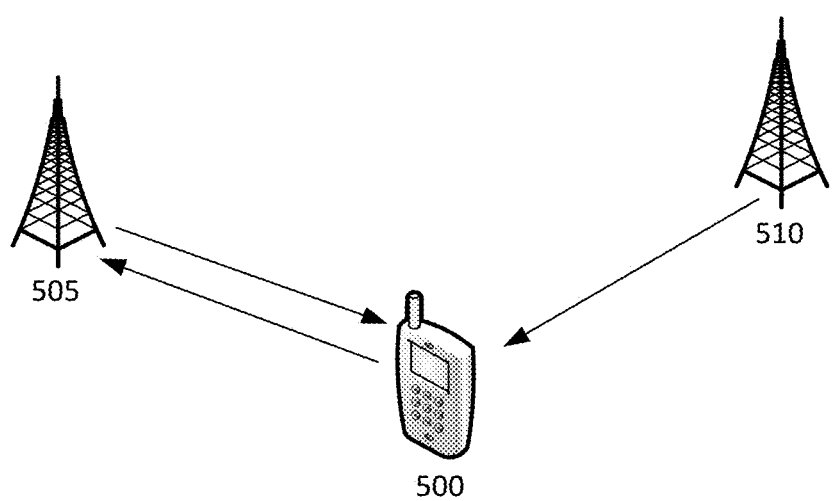
FIG. 5 illustrates an example of a system, according to an embodiment.

It will be readily understood that the components of the invention, as generally described and illustrated in the figures herein, may be arranged and designed in a wide variety of different configurations. Thus, the following detailed description of the embodiments of systems, methods, apparatuses, and computer program products for obtaining additional supported bands of neighbor cells via ANR, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention.

Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments. Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Some embodiments of the invention are applicable to LTE/UMTS and, in particular, may relate to SON and ANR in case neighbour cell(s) support multiple frequency bands.

For LTE and UMTS, physical frequency bands with different band number may entirely or partially overlap. Therefore, one cell may support multiple bands. As a release independent feature, 3GPP added multi frequency band Indicator (MFBI) signaling in various places. For instance, in LTE as depicted in FIG. 1, the legacy part of system information block 1 (SIB1) broadcasts its native band number, e.g., freqBandIndicator 100, and if the native band number is in an extended range, e.g., freqBandindicator-v9e0 101, but the cell may broadcast additional band numbers which the cell supports, e.g., multiBandInfoList 105 and if the additional band numbers are in an extended range, multiBandInfoList-v9e0 106.

Additionally, for UE-associated signaling, if a cell supports band 5 and band 26, for example, and the UE indicates only band 26 but not band 5 in its capability, the network has to make sure that all dedicated messages are configured based on band 26 rather than band 5. Also during the handover, the source eNB decides the target frequency for the UE, taking into account the UE capability and supported band(s) in the target cell. Thus, in the above case, the network has to know whether or not neighbor cells support MFBI functionality.

In order to inform a cell's neighbors which additional frequency bands, if any, are supported by the cells, the X2 interface (specified by 3GPP TS 36.423) may include the list of additional frequency bands which a cell supports in the X2 Setup Request, X2 Setup Response, and/or eNB Configuration Update messages.

The MultibandInfoList information element (IE) contains the additional frequency band indicators that a cell belongs to listed in decreasing order of preference, as depicted in FIG. 2 (see 3GPP TS 36.423). However, the X2 interface is not always available between eNBs in the LTE network and is not available for the inter-RAT (radio access technology) case. Therefore, the information regarding which additional frequency bands, if any, that the neighbor cell supports is not available to the serving cell in the aforementioned cases. For these scenarios, operations and maintenance (O&M) has to configure this information, or MFBI cannot be considered during the mobility decision. Embodiments of the invention solve at least this problem.

The ANR feature is defined in a way to allow the serving cell to request the UE to read and report the Global Cell Identity, tracking area code (TAC), and Public Land Mobile Network Identities (PLMN Id(s)) of a neighbour cell. Embodiments of the invention are able to extend this ANR functionality so that the UE can also read the Frequency Band List which a neighbour cell broadcasts in SIB1 in LTE system and SIB5/5bis in UMTS system and report it to the serving cell.

According to one embodiment, the necessary parameters (e.g., multiBandInfoList) for indicating the frequency band list of the neighbor cell(s) may be added into the MeasResultEUTRA and/or MeasResultUTRA report. FIG. 3a illustrates an example of a MeasResultEUTRA report that includes the multiBandInfoList-rxx parameter 300. FIG. 3b illustrates an example of a MeasResultUTRA report that includes the multiBandInfoListUMTS-rxx parameter 301.

Alternatively, in another embodiment, a new parameter may be included in the lateNonCriticalExtension parameter 400 of a measurement report, as illustrated in FIG. 4.

According to an embodiment, the multiBandInfoList may be included in the MeasurementReport if:

The MeasurementReport was for a reportCGI measurement;

The UE is capable of reporting the Frequency Band List to the serving cell in the MeasurementReport; and/or The neighbour cell supports additional frequency bands (e.g., it is broadcasting the multiBandInfoList IE and/or multiBandInfoList-v9e0 in SIB1).

In an embodiment, the serving cell may need to know whether a lack of presence of the multiBandInfoList-rxx in the measurement report was because the neighbour cell was not broadcasting the multiBandInfoList, or because the UE was not capable of reading and/or reporting it. This could be achieved via several methods according to certain embodiments.

For example, in one embodiment, a new Feature Group Indicator (FGI) bit could be defined indicating whether the UE supported this functionality. This approach would allow the serving cell to proactively choose capable UEs to perform the reportCGI measurement, rather than determining based on the MeasurementReport whether the UE was capable of reporting the additional frequency bands supported by the neighbour cell.

In another embodiment, for LTE, FGI31 is used to indicate whether UE supports/has been tested for MFBI function or not. A UE capability bit is defined for the same purpose in UMTS. Thus, in this embodiment, the definition of FGI31 in LTE and the capability in UMTS could be extended to include the support of extended ANR functionality.

According to yet another embodiment, a new UE capability IE could be defined to indicate whether or not the UE supports this extended ANR functionality. Further, the functionality may be made mandatory for the UE starting in a particular 3GPP release.

According to another embodiment, a variant of the multiBandInfoList-rxx IE may be defined for the measurement report which allowed 0 to maxMultiBands instances of FreqBandIndicator-r11, rather than 1 to maxMultiBands instances of FreqBandIndicator-r11. With this approach, if the multiBandInfoList-rxx IE was included in the measurement report but was empty (i.e., it included 0 instances of FreqBandIndicator-r11), it would indicate that the neighbor cell does not support additional frequency bands; if the multiBandInfoList-rxx IE was not included, it would indicate that the UE was not capable of reading and/or reporting the multiBandInfoList-rxx of the neighbor cell.

FIG. 5 illustrates an example of a system in which embodiments of the invention may be applicable. FIG. 5 illustrates one example system, but embodiments may be similarly applicable to other systems or configurations. As illustrated in FIG. 5, the system may include UE 500, serving cell 505, and neighbor cell 510. As mentioned above, UE 500 may be configured to read/receive the Frequency Band List which neighbour cell 510 broadcasts, for example in SIB1, and report it to the serving cell 505.

Figure 6A:
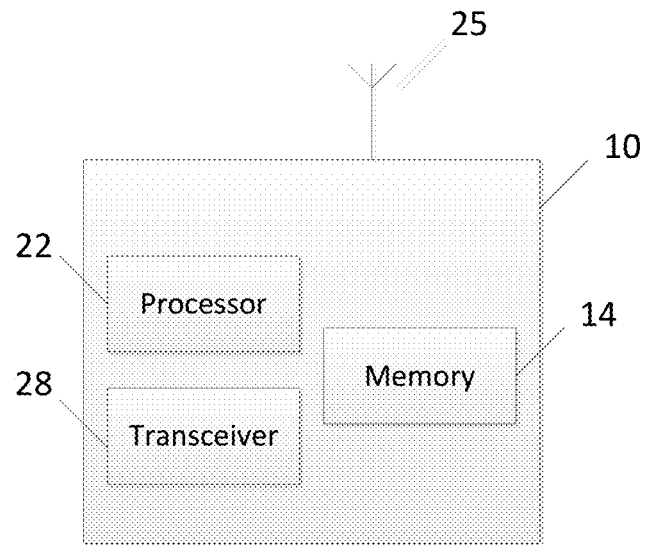
FIG. 6a illustrates an example of an apparatus, according to an embodiment.

FIG. 6a illustrates an example of an apparatus 10 according to an embodiment. In one embodiment, apparatus 10 may be a mobile device or UE. Further, it should be noted that one of ordinary skill in the art would understand that apparatus 10 may include components or features not shown in FIG. 6a. Only those components or features necessary for illustration of the invention are depicted in FIG. 6a.

As illustrated in FIG. 6a, apparatus 10 includes a processor 22 for processing information and executing instructions or operations. Processor 22 may be any type of general or specific purpose processor. While a single processor 22 is shown in FIG. 6a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 further includes a memory 14, which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas 25 for transmitting and receiving signals and/or data to and from apparatus 10. Apparatus 10 may further include a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a mobile station or UE. In this embodiment, apparatus 10 may be controlled by memory 14 and processor 22 to read/receive a frequency band list broadcast by at least one neighbor cell, and to report the frequency band list to a cell (e.g., eNB) serving the user equipment. Apparatus 10 may be further controlled by memory 14 and processor 22 to add an information element comprising the frequency band list to a measurement report, and to send the measurement report comprising the information element to the serving cell. In one embodiment, the information element comprises a multiBandInfoList information element.

According to an embodiment, apparatus 10 may be further controlled by memory 14 and processor 22 to add a new parameter in lateNonCriticalExtension of the measurement report. For example, in an embodiment, the measurement report may be a MeasResultEUTRA or MeasResultUTRA. In one embodiment, apparatus 10 may be further controlled by memory 14 and processor 22 to add the information element to the measurement report when the measurement report is for a reportCGI measurement, when the user equipment is capable of reporting the frequency band list to the serving cell in the measurement report, and/or when the neighbor cell supports additional frequency bands.

Figure 6B:
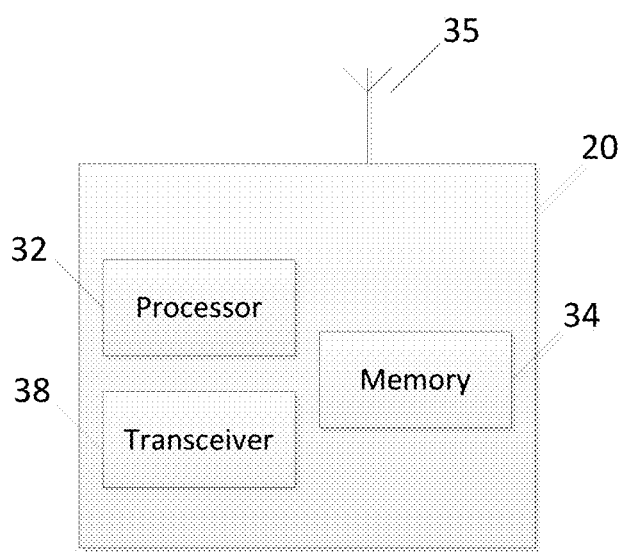
FIG. 6b illustrates an example of an apparatus, according to another embodiment.

FIG. 6b illustrates an example of an apparatus 20 according to another embodiment. In an embodiment, apparatus 20 may be a base station or eNB, such as a serving base station or serving eNB. It should be noted that one of ordinary skill in the art would understand that apparatus 20 may include components or features not shown in FIG. 6b. Only those components or features necessary for illustration of the invention are depicted in FIG. 6b.

As illustrated in FIG. 6b, apparatus 20 includes a processor 32 for processing information and executing instructions or operations. Processor 32 may be any type of general or specific purpose processor. While a single processor 32 is shown in FIG. 6b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 further includes a memory 34, which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also include one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a serving base station or eNB. In this embodiment, apparatus 20 may be controlled by memory 34 and processor 32 to receive a measurement report from a UE capable of reading and reporting a frequency band list broadcast by at least one neighbor cell. The frequency band list may comprise frequency band numbers that the at least one neighbor cell supports, and the measurement report may comprise an information element comprising the frequency band numbers supported by the at least one neighbor cell. In one embodiment, the information element may comprise a multiBandInfoList-rxx information element.

According to an embodiment, apparatus 20 may be further controlled by memory 34 and processor 32 to define an indicator to indicate whether the user equipment is capable of reading and reporting the frequency band numbers supported by the at least one neighbor cell. In an embodiment, the indicator may comprise a feature group indicator (FGI) and/or a user equipment capability information element. In some embodiment, for example for LTE, the FGI may be FGI31 used to indicate whether the UE supports MFBI functionality or not.

In an embodiment, the multiBandInfoList-rxx information element allows 0 to maxMultiBands instances of FreqBandIndicator-r11. When the multiBandInfoList-rxx information element comprises 0 instances of FreqBandIndicator-r11, it is an indication that the at least one neighbor cell does not support additional frequency bands.

Figure 7:
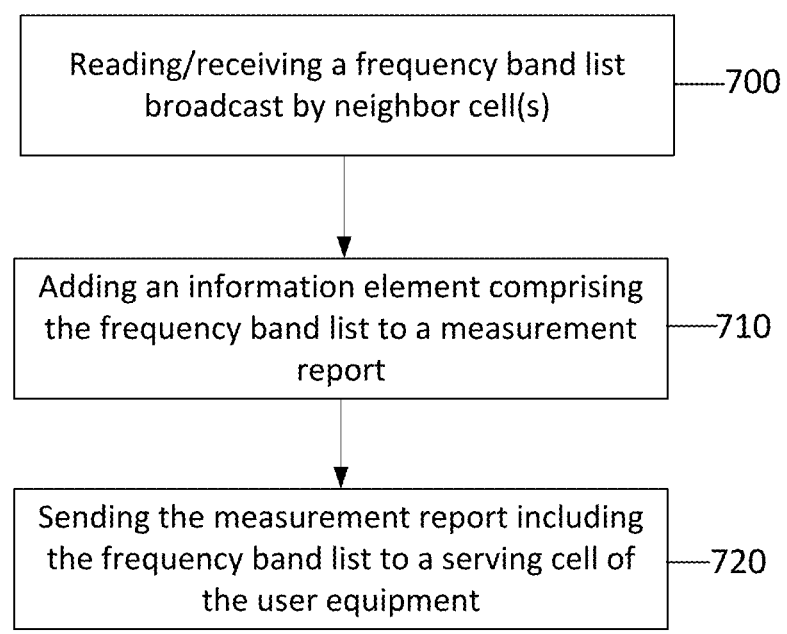
FIG. 7 illustrates an example of a flow diagram of a method, according to an embodiment.

FIG. 7 illustrates an example of a flow diagram of a method, according to one embodiment. In an embodiment, the method of FIG. 7 may be performed by a UE. The method may include, at 700, reading or receiving a frequency band list broadcast by neighbor cell(s). In some embodiments, the method may further include, at 710, adding an information element comprising the frequency band list to a measurement report. The method may further include, at 720, sending the measurement report including the frequency band list to a serving cell of the user equipment.

In some embodiments, the functionality of any of the methods described herein, such as that illustrated in FIG. 7 discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
reading, by a user equipment, a frequency band list broadcast by a neighbor cell, wherein the frequency band list comprises additional frequency bands supported by said neighbor cell;
reporting, to a cell serving the user equipment, the frequency band list comprising the frequency bands supported by said neighbor cell; and
adding an information element comprising the frequency band list to a measurement report, and wherein the reporting comprises sending the measurement report comprising the information element to the serving cell, wherein the adding further comprises adding the information element to the measurement report when the measurement report is for a reportCGI measurement, when the user equipment is capable of reporting the frequency band list to the serving cell in the measurement report, and when the neighbor cell supports additional frequency bands.

2. The method according to claim 1, wherein the adding further comprises adding a new parameter in lateNonCriticalExtension of the measurement report.

3. The method according to claim 1, wherein the measurement report comprises MeasResultEUTRA or MeasResultUTRA.

4. An apparatus, comprising:
at least one processor; and at least one memory including computer program code,
wherein the at least one memory and the computer program code are configured, with the at least one processor, to cause the apparatus at least to
read a frequency band list broadcast by a neighbor cell, wherein the frequency band list comprises additional frequency bands supported by said neighbor cell;
report, to a cell serving the apparatus, the frequency band list comprising the frequency bands supported by said neighbor cell; and
add an information element comprising the frequency band list to a measurement report, and wherein the reporting comprises sending the measurement report comprising the information element to the serving cell, wherein the at least one memory and the computer program code are further configured, with the at least one processor, to cause the apparatus at least to add the information element to the measurement report when the measurement report is for a reportCGI measurement, when the apparatus is capable of reporting the frequency band list to the serving cell in the measurement report, and when the neighbor cell supports additional frequency bands.

5. The apparatus according to claim 4, wherein the apparatus is a user equipment.

6. The apparatus according to claim 4, wherein the at least one memory and the computer program code are further configured, with the at least one processor, to cause the apparatus at least to add a new parameter in lateNonCriticalExtension of the measurement report.

7. The apparatus according to claim 4, wherein the measurement report comprises MeasResultEUTRA or MeasResultUTRA.

8. A computer program, embodied on a non-transitory computer readable medium, the computer program configured to control a processor of a user equipment to perform a process, comprising:
reading a frequency band list broadcast by a neighbor cell, wherein the frequency band list comprises additional frequency bands supported by said neighbor cell;
reporting, to a cell serving the user equipment, the frequency band list comprising the frequency bands supported by said neighbor cell; and
adding an information element comprising the frequency band list to a measurement report, and wherein the reporting comprises sending the measurement report comprising the information element to the serving cell, wherein the adding further comprises adding the information element to the measurement report when the measurement report is for a reportCGI measurement, when the computer program is capable of reporting the frequency band list to the serving cell in the measurement report, and when the neighbor cell supports additional frequency bands.

9. The computer program according to claim 8, wherein the adding further comprises adding a new parameter in lateNonCriticalExtension of the measurement report.

10. The computer program according to claim 8, wherein the measurement report comprises MeasResultEUTRA or MeasResultUTRA.

* * * * *